United States Patent [19]
McCoy et al.

[11] 3,720,908
[45] March 13, 1973

[54] ELECTROMECHANICAL ACOUSTIC NOISE SOURCE

[75] Inventors: Bernard J. McCoy, Herndon, Va.; Frank O. Rans, Rockville, Md.

[73] Assignee: The United States of America as represented by the Secretary of the Navy

[22] Filed: Dec. 3, 1970

[21] Appl. No.: 94,925

[52] U.S. Cl. ............... 340/8 R, 116/27, 116/137 R, 181/0.5 AG, 340/5 D
[51] Int. Cl. ............................................. H04b 11/00
[58] Field of Search ............. 340/5 D, 5 R, 8 R, 12 R; 181/0.5 R, 0.5 A, 0.5 AG; 116/27, 137 A, 137 R

[56] References Cited

UNITED STATES PATENTS

| 3,319,735 | 5/1967 | Hayes et al. | 181/0.5 |
| 2,548,905 | 4/1951 | Odenweller et al. | 116/27 |
| 3,263,208 | 7/1966 | Douglas et al. | 181/0.5 A X |
| 2,395,862 | 3/1946 | Freeman et al. | 116/27 |

Primary Examiner—Richard A. Farley
Attorney—R. S. Sciascia, Q. E. Hodges and R. M. Wohlfarth

[57] ABSTRACT

An acoustic noise source wherein the noise is generated electromechanically by the rotation of a mass within and in rolling contact with a slotted thin-walled cylinder.

14 Claims, 3 Drawing Figures

PATENTED MAR 13 1973

INVENTORS
BERNARD J. McCAY
FRANK O. RANS

BY *Hodges*
*Robert Wohlgemuth*
ATTORNEYS

INVENTORS
BERNARD J. McCAY
FRANK O. RANS
ATTORNEYS

ELECTROMECHANICAL ACOUSTIC NOISE SOURCE

The invention described herein may be manufactured and used by or for the Government of the United States of America for governmental purposes without the payment of any royalties thereon or therefor.

BACKGROUND OF THE INVENTION

1. Field of the Invention

Sonar systems whether used on submarine or surface ships have to be calibrated by use of an acoustic noise source. The noise source is usually electronic and can be designed to operate over a desired frequency span.

2. Description of the Prior Art

At the present, state-of-the-art devices for generating noise for sonar calibration are largely piezoelectric and some magnetostrictive.

The piezoelectric devices utilize crystal transducers. These devices are not flexible in their coverage of the frequency spectrum. Therefore, to achieve lower frequencies the transducers must get larger. To insure proper coverage of the frequency spectrum four separate transducers, each tuned to a portion of the spectrum, are used. Each transducer requires its own power amplifier, signal generating, sloping network and other equipment. In addition, to size and complexity, cost becomes prohibitive. Also, the power output in the low frequency end of the spectrum is low, and the spectrum is irregular.

SUMMARY OF THE INVENTION

This invention provides an electromechanical noise source which utilizes a slotted cylinder with a rotating mass therein. The cylinder is thin walled and the contact between the rotating mass and the interior of the cylinder, as the mass passes from slotted section to slotted section, creates acoustic power at the excitation frequency, its harmonics, and the ring frequency of the cylinder. The exterior of the cylinder is coated with a rubber material having low pass filter characteristics, thereby attenuating the excessive higher frequencies. The ability of the calibration source to be tuned to a frequency spectrum by choosing a specific number of slots in the cylinder or by varying the RPM of the rotating mass allows a much smaller and versatile unit to be made at a fraction of the cost of previous devices.

DESCRIPTION OF THE INVENTION

Figure 1:
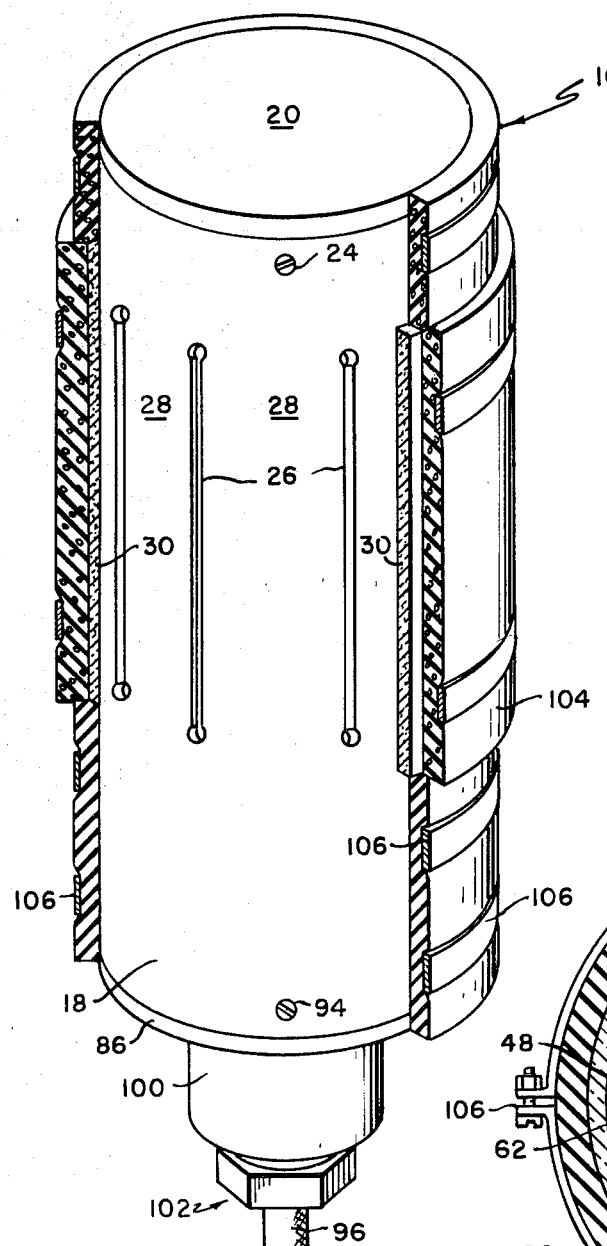
FIG. 1 is a perspective view of the invention with some parts cut away for clarity.
Figure 3:
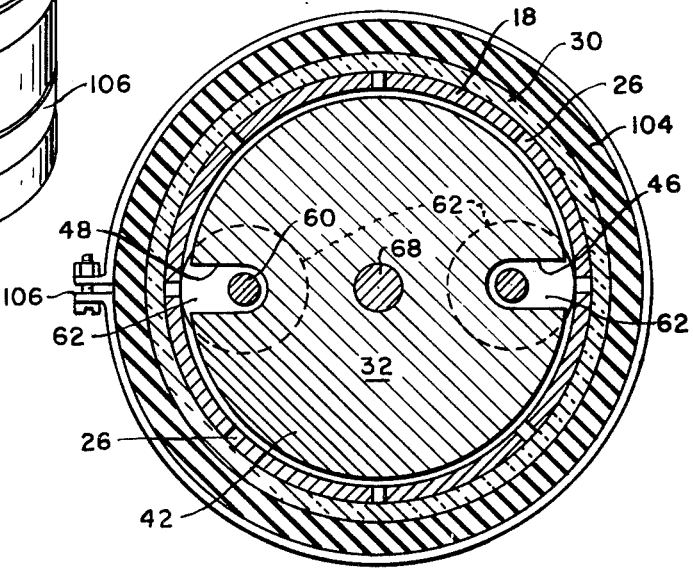
FIG. 3 is a sectional view taken along the line 3—3 of FIG. 2.
Figure 2:
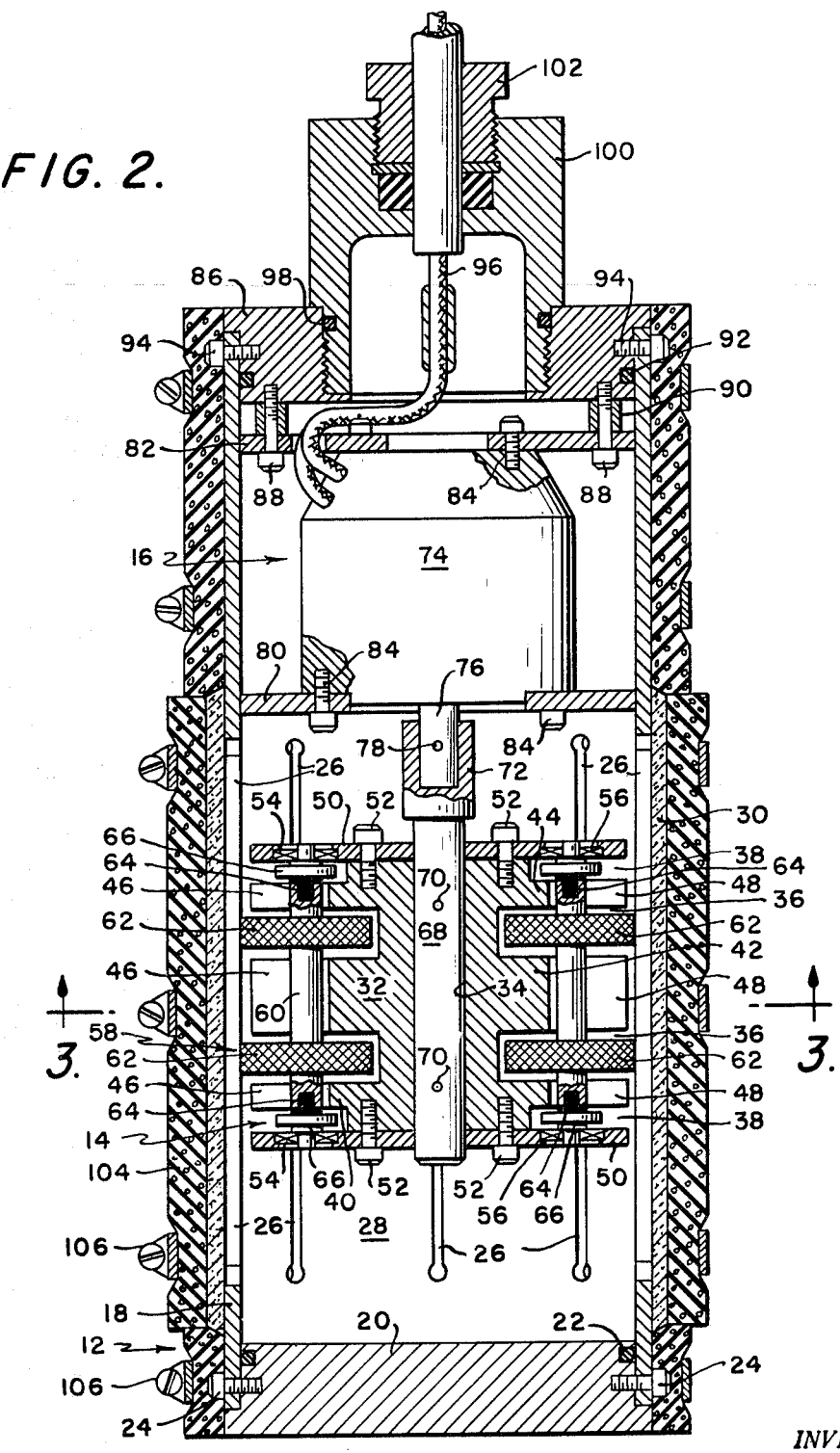
FIG. 2 is longitudinal view of the invention, mostly in section with some parts broken away for clarity.

Referring now to the drawings the acoustic noise source is indicated generally at 10. A casing 12 completely encloses the calibration source 14 and the power section 16.

The casing 12 has an elongated relatively thin walled cylinder 18 that is closed on one end by a cap 20. The cap 20 has an O-ring 22 that seals on the inner circumference of the cylinder 18 to produce a water tight seal therebetween. The cap is held in position by a series of screws 24 extending through the cylinder 18 and into the cap 20.

The cylinder 18 has a plurality of slots 26 cut into the circumference thereof along the longitudinal axis. The slots 26 are positioned near the end of the cylinder adjacent the cap 20 and divide the circumference of the cylinder into longitudinally extending beams 28. To maintain the water tight integrity of the cylinder 18 a collar of polyethylene 30 is molded around the circumference to overlie the slots 26. Thus the water tight cylindrical casing 12 is formed, with a series of beams 28 along the wall thereof at the end of the casing surrounding the calibration source 14.

The calibration source 14 rotates within the cylinder 18, across the beams 28 and has a main spindle 32 mounted concentric with the longitudinal axis of the casing. The spindle 32 is cylindrical in configuration and has a circumference somewhat less than the inner diameter of the cylinder 18 with a center bore 34 extending through the center thereof. A pair of annular grooves 36 and a pair of annular notches 38 are cut into the circumference thereof, leaving a series of lands 40, 42 and 44 therebetween. A pair of aligned U-shaped notches 46 and 48, spaced apart 180° on the circumference, are cut into the lands 40, 42 and 44 whose function will be described hereinafter.

A pair of end caps 50, having the same circumference as the spindle 32, are attached to the ends thereof by a series of screws 52. The end caps 50 have opposed pairs of bearings 54 and 56, mounted on their inner face, in alignment with the bottom of the notches 46 and 48, respectively, to provide an axis of rotation for a pair of rotating masses 58.

The pair of rotating masses 58 are identical and have a main shaft 60 with a pair of annular rings 62 fixed thereon in spaced relation to coincide with the annular grooves 36. The main shafts 60 of each mass 58 has a non-metallic section 64 on the ends thereof. The section 64 is usually Teflon and acts to reduce shear friction generated by the rotation of the mass 58. An end cap 66 is fixed on the end of each section 64 to be received in the pairs of bearings 54 and 56. When the mass 58 is in position and journalled for rotation in the bearings 54 and 56, the main shafts 60 extend through the notches 46 and 48 with the rings 62 received in the grooves 36 and in rolling engagement with the inner surface of the cylinder 18. A drive shaft 68 is received in the center bore 34 of the spindle 32 and fixed thereto by pins 70 to transmit the driving rotation movement thereto. The drive shaft 68 has a socket 72 on the free end thereof to receive the motor shaft from the power section 16.

The power section 16 has a DC motor 74 whose shaft 76 is received in the socket 72 and fixed thereto by means of a pin 78. The motor 74 has a pair of circular plates 80 and 82 attached to the ends thereof by a series of screws 84. The plates 80 and 82 have approximately the same diameter as the inner diameter of the cylinder 18 and are adapted to slide therein. The plate 82 is attached to a cap 86 by means of screws 88 and spacers 90. The cap 86 is similar to the cap 20 and has an O-ring 92 to seal the cap to the inner circumference of the cylinder 18 to produce a water tight seal therebetween. The cap is held in position by a series of screws 94 extending through the cylinder 18 and into the cap 86. The wires 96, from the motor 74 extend through an opening 98 in the cap 86. Any convenient means can be used to effect a water tight seal for the passage of the wires 96 through the opening 98 in the cap 86. A cup-shaped member 100 is shown threadedly engaged in the opening 98 with a threaded gland fitting 102 to seal the wires 96.

Thus, the entire unit maintained with water tight integrity when completely assembled. To complete the structure of the invention, the entire casing is wrapped with a layer of material 104. The material 104 should be a rubber based product with air pockets therein. A commercial available produce RAL has been found to serve the purpose since it acts as a low pass filter for attenuating the excessive higher frequencies produced by the calibration source. The RAL covering 104 can be held in position by any convenient means such as the clamps 106 shown in the drawing.

In operation, DC voltage is supplied to the motor 74 which turns the spindle 32 through the motor shaft 76 and the drive shaft 68. The turning of the spindle 32 causes the masses 58 to rotate due to the rolling contact of the annular rings 62 with the inner surface of cylinder 18. As the rotating masses 58 move over the slots 26 and beams 28 an impact occurs on each beam. This impact causes a displacement of the beam and a corresponding displacement of the water, creating acoustic power at the excitation frequency, its harmonics, and the ring frequency of the cylinder.

The frequency of the excitation is given by:

$$F = NtD/60d$$

where
 $N$ = motor RPM
 $t$ = number of slots
 $D$ = ID of cylinder
 $d$ = OD of rotating mass
The ring frequency is given by:

$$F = c/\pi d$$

where:
 $C$ = speed of sound in cylinder wall
 $d$ = diameter of cylinder

In addition, to controlling the excitation frequency the longitudinal slots 26 in the cylinder 18 serve to govern the amplitude of the transmitted spectrum by acting as a fixed-fixed beam in the lower frequency range of the spectrum between 100 and 800 Hz. This increase averages 15 db compared to a non-slotted cylinder, while effectively decoupling the upper frequency range of the spectrum between 1.6 and 10 kHz, at 6 db. Also, the RAL covering 104 acts as a low pass filter to attenuate the excessive higher frequency above 1 kHz an additional 6 db.

As can be seen, a relatively simple and inexpensive noise source is provided for calibrating sonar units that has a wide range of frequency production from a single unit. The unit is also smaller and more rugged.

Obviously many modifications and variations of the present invention are possible in the light of the above teachings. IT is therefore to be understood that within the scope of the appended claims the invention may be practiced otherwise than as specifically described.

What is claimed is:

1. An acoustic noise source, comprising:
    a casing;
    a power source mounted within the casing;
    a calibration source within the casing connected to the power source to be rotated thereby and to impact with the casing to produce acoustic noise within a selected exitation frequency spectrum;
    means for selecting the spectrum; and
    means for attenuating the spectrum.

2. A device according to claim 1 wherein said casing is a thin walled cylinder with closure members at each end thereof.

3. A device according to claim 2 where at least two longitudinal slots are cut into the cylinder near one end thereof.

4. A device according to claim 3 wherein a collar of elastic material is molded around the slots to maintain the closed cylinder water tight.

5. A device according to claim 4 wherein the cylinder and collar are covered with an expanded rubber material.

6. A device according to claim 1 wherein the calibration source is a rotating member within the casing and in contact therewith.

7. A device according to claim 6 wherein the rotating member includes a spindle and two rotating masses journalled for rotation thereon.

8. A device according to claim 7 wherein the spindle is driven by the drive means and the rotating masses are in rolling contact with the interior of the casing.

9. A device according to claim 1 wherein said casing includes a thin walled cylinder with at least two longitudinal slots at one end thereof.

10. A device according to claim 9 wherein the calibration source includes a rotating mass in rolling contact with the interior slotted end of the cylinder.

11. The device of claim 1 wherein the means for selecting the exitation frequency spectrum comprises:
    a plurality of slots longitudinally provided in the casing for forming a plurality of substantially uniform longitudinal beams therebetween.

12. The device of claim 11 wherein the means for attenuating the spectrum comprises:
    a layer of air pocketed rubber based material wrapped about the casing.

13. An acoustic noise source, comprising:
    an elongated cylindrical casing;
    a plurality of slots longitudinally provided in the casing for forming a plurality of substantially uniform longitudinal beams therebetween;
    a power source mounted within the casing;
    a calibration source connected to the power source to be rotated thereby within the cylinder and to impact with the beams to produce acoustic noise within a selected frequency spectrum; and
    a layer of air pocketed rubber based material wrapped about the casing for attenuating the spectrum.

14. An acoustic noise source, comprising:
    an elongated cylindrical casing;
    a plurality of slots longitudinally provided in the casing for forming a plurality of substantially uniform longitudinal beams therebetween;
    a power source mounted within the casing;
    a calibration source connected to the power source to be rotated thereby within the cylinder and having an outside diameter provided to impact with the inside diameter of the casing at the beams to produce acoustic noise within a selected exitation frequency spectrum as represented by the formula: $F=NtD/60d$, where $N$ is the RPM of the power source, $t$ is the number of slots, $D$ is the inside diameter of the cylinder and $d$ is the outside diameter of the calibration source.

* * * * *